United States Patent [19]

Nakai et al.

[11] Patent Number: 5,395,700
[45] Date of Patent: Mar. 7, 1995

[54] HARD SINTERED COMPACT FOR TOOLS

[75] Inventors: Tetsuo Nakai; Mitsuhiro Goto, both of Hyogo, Japan

[73] Assignee: Sumitomo Electric Industries, Ltd., Osaka, Japan

[21] Appl. No.: 904,353

[22] Filed: Jun. 25, 1992

[30] Foreign Application Priority Data

Jun. 25, 1991 [JP] Japan ................................ 3-153099
Jun. 25, 1991 [JP] Japan ................................ 3-153100

[51] Int. Cl.⁶ ................................................ B22F 7/06
[52] U.S. Cl. ........................... 428/552; 428/548; 428/551; 428/557; 428/564; 428/565; 428/568; 428/569; 75/236; 75/237; 75/238; 75/249
[58] Field of Search ................ 428/548, 551, 552, 553, 428/557, 564, 565, 567, 568, 569; 75/228, 230, 236, 237, 238, 244, 249

[56] References Cited

U.S. PATENT DOCUMENTS

| 4,334,928 | 6/1982 | Hara et al. | 75/238 |
| 4,343,651 | 8/1982 | Yazu et al. | 75/238 |
| 4,403,015 | 9/1983 | Nakai et al. | 428/565 |
| 4,505,746 | 3/1985 | Nakai et al. | 75/243 |
| 4,686,080 | 8/1987 | Hara et al. | 419/8 |
| 4,693,746 | 9/1987 | Nakai et al. | 75/238 |
| 4,880,707 | 11/1989 | Kohno et al. | 428/565 |
| 4,911,756 | 3/1990 | Nakai et al. | 75/238 |
| 4,944,772 | 7/1990 | Cho | 51/293 |
| 5,034,053 | 7/1991 | Nakai et al. | 75/238 |
| 5,041,399 | 8/1991 | Fukaya et al. | 501/87 |
| 5,092,920 | 3/1992 | Nakai et al. | 75/238 |

FOREIGN PATENT DOCUMENTS

| 223585 | 5/1987 | European Pat. Off. . |
| 2498962 | 8/1982 | France . |
| 2091763 | 8/1982 | United Kingdom . |

OTHER PUBLICATIONS

Patent Abstracts of Japan, vol. 11, No. 322 (C-453) (2769) 20 Oct. 1987 & JP-A-62 109 975 (Toshiba Tungalogy) 21 May 1987 *abstract*.

Primary Examiner—Donald P. Walsh
Assistant Examiner—Chrisman D. Carroll
Attorney, Agent, or Firm—Pennie & Edmonds

[57] ABSTRACT

In this invention, a cutting tool comprises two layers of hard sintered compact of cBN. The first sintered compact layer comprises about 75-98% by volume of cBN and a first binder material. The first binder material comprises from about 1 to out 40% by weight of Al. The second sintered compact layer comprises from about 40 to about 65% by volume of cBN and a second binder material. The second binder material comprises about 2 to about 30% by weight of Al. The first sintered compact layer is bonded to the second sintered compact layer. This composite material is bonded directly or indirectly to a tool holder to form a cutting tool. The first sintered compact layer constitutes a rake face of the cutting tool.

7 Claims, 2 Drawing Sheets

HARD SINTERED COMPACT FOR TOOLS

BACKGROUND OF THE INVENTION

1. Field of Invention

This invention relates to a two layer cubic boron nitride (cBN) sintered compact for a cutting tool. More particularly, the invention relates to a cBN sintered compact having two layers, each with a different concentration of cBN therein.

2. Description of the Background Art

Cubic boron nitride is the hardest known material other than diamond. Sintered compact of cubic boron nitride (cBN) is employed in various cutting tools. Recently, sintered compacts having fine cBN particles bonded with metals, or with various ceramics, using a high pressure sintering technique, have become commercially available. When the composite material of the sintered compacts is utilized as an insert in a machining tool, the hard sintered compact layer is placed only on the cutting edge portion. The tool holder to which the hard sintered compact layer is bonded has high rigidity, such as a cemented carbide.

U.S. Pat. No. 4,334,928 of Yazu et al discloses a cBN sintered compact suitable for cutting tools containing about 20 to about 80% by vol. of cBN. The remaining portion is carbide, nitride, boride and silicide of elements selected from groups IVa and Va Periodic Table, with mixtures thereof or solid solution compounds as the principal components. The bonding phase of the sintered compact is continuous.

Japanese Patent Laying-Open No. 62-228450 discloses a hard sintered compact for cutting tools comprising a binder, which comprises about 25 to about 50% by wt. of Al, a compound comprising Ti, such as a carbide of Ti, and from about 4 to about 40% by weight of W, which may be in the form of WC. These components react with cBN during sintering, to produce aluminum boride, titanium boride and the like, which serve to bond the binder and cBN [or another binder].

U.S. Pat. No. 4,911,756 of Nakai et al. discloses a hard sintered compact for tools, comprising from about 50 to about 75% by vol. of cBN and from about 25 to about 50% by vol. of a binder. The binder comprises from about 20 to about 50% by wt. of aluminum, titanium carbonitride, and the like, and from about 4 to about 40% by wt. of tungsten.

U.S. Pat. No. 3,743,489 of Wentorf et al., discloses a cBN sintered compact suitable for cutting tools comprising greater than 70% by volume of cBN. The remaining metallic phase consists of aluminum and at least one alloying element selected from the group consisting of nickel, cobalt, manganese, iron, vanadium, and chromium and mixtures thereof.

U.S. Pat. No. 4,403,015 of Nakai et al. discloses a cBN sintered compact suitable for cutting tools. An intermediate bonding layer is formed from a powder. The bonding layer is comprised of cBN in an amount less than 70% by volume, the residual part principally consisting of a compound selected from carbide, nitride, carbonitride or boride of transition metals of groups IVa, Va and VIa of the Periodic Table, an admixture thereof, or a solid solution compound thereof. After the powder is pressed, or in the state of powder, this bonding layer is placed on the cemented carbide substrate in a thickness less than 2 mm. A powder containing diamond or cBN in an amount in excess of 20% by volume is placed in the bonding layer and the whole compact is then sintered under extreme pressure and temperature.

FIG. 1 is a partial side view of a typical cutting tool of the prior art, having a cutting edge portion of uniform composition of cBN throughout the cutting edge portion. In FIG. 1, a cutting edge portion (20) of uniform composition of cBN sintered composite is bonded to a cemented carbide tool holder (50) by a cemented carbide layer (22). The cutting edge portion (20) is composed of a cutting edge (20c), a rake face (20a) and a flank face (20b). The cutting edge (20c) is a boundary of the rake face and the flank face. FIG. 2, is a partial cross-sectional view of a cutting process using an insert of the tool from FIG. 1. As shown in FIG. 2, a workmaterial (100) rotates at a high rate of speed in the direction of the arrow. The cutting tool is moved into the rotating workmaterial, and a chip (101) is made on the rake face (20a) of the cutting edge portion (20). As cutting continues, crater wear (31) develops on the rake face and flank wear (32) develops on the flank face (20b). The wear on each face is shown in FIG. 3. The crater wear (31) and the flank wear (32) have a boundary of the cutting edge (20c) which contacts with a surface of the workmaterial (100). Notch wear (33) develops at the boundary of the portion in contact with the workmaterial and air. As a result, as cutting continues, partial wear, rather than uniform wear develops on the cutting edge portion. As the wear progresses in a non-uniform manner, it eventually becomes impossible to continue cutting so that the non-uniform wear shortens the practical cutting time.

Accordingly, a need exists for a sintered compact for a cutting tool that has an extended practical cutting time when used as the cutting edge portion of a cutting tool.

SUMMARY OF THE INVENTION

An object of this invention is to provide a sintered compact for a cutting tool which has higher flank wear resistance, higher crater wear resistance, and higher notch wear resistance.

Another object of this invention is to provide a cutting edge portion for a cutting tool having increased practical cutting time when used to cut nodular cast iron, high speed steel, and Inconel.

Another object of this invention is to provide a cBN sintered compact which has increased practical cutting time and which does not suffer from nonuniform or partial wear.

The present invention is directed to a cBN sintered compact for a cutting tool. The cBN sintered compact has two layers. The first sintered compact layer comprises from about 75 to about 98% by volume of cBN and a first binder material. The first binder material comprises from about 1 to about 40% by weight of Al. The second sintered compact layer comprises from about 40 to about 65% by volume of cBN and a second binder material. The second binder material comprises from about 2 to about 30% by weight of Al. The first sintered compact layer is bonded to the second sintered compact layer. This composite material may be bonded directly or indirectly to a tool holder. The first sintered compact layer constitutes a rake face of the cutting tool.

The foregoing and other objects, and features, aspects and advantages of the present invention will become apparent from the following detailed description

DETAILED DESCRIPTION OF THE INVENTION

In accordance with the present invention, it has now been found that a two layer cBN sintered compact in which the concentration of cBN in a first sintered compact layer, which comprises a rake face of a cutting tool, is different from the concentration of cBN in a second sintered compact layer, which comprises a flank face of a cutting tool, has increased practical cutting time compared to the prior art cBN sintered compacts, which have uniform cBN composition throughout.

Figure 4:
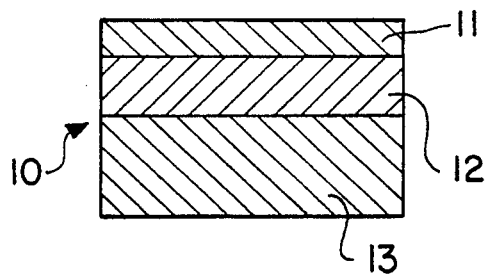
FIG. 4 shows a cross-sectional view of the sintered compact of the present invention.

FIG. 4 illustrates the cutting edge portion of the present invention. The cutting edge portion (10) comprises a composite of a first sintered compact layer (11), a second sintered compact layer (12) and a cemented carbide substrate (13). The first sintered compact layer (11) comprises from about 75 to about 98% by volume of cBN and first binder material. The first binder material comprises from about 1 to about 40% by weight of Al. The second sintered compact layer (12) comprises from about 40 to about 65% by volume of cBN and a second binder material. The second binder material comprises from about 2 to about 30% by weight of Al. The second binder material constitutes a continuous matrix. The first sintered compact layer (11) is bonded to the second sintered compact layer (12).

Figure 1:
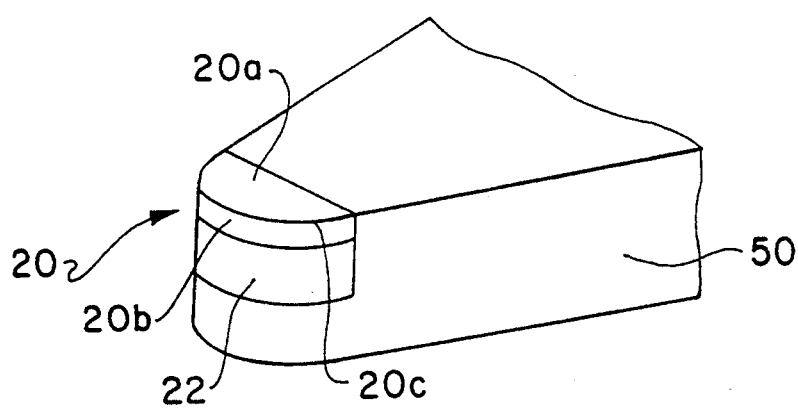
FIG. 1 is a partial side view of a cutting tool of the prior art.
Figure 2:
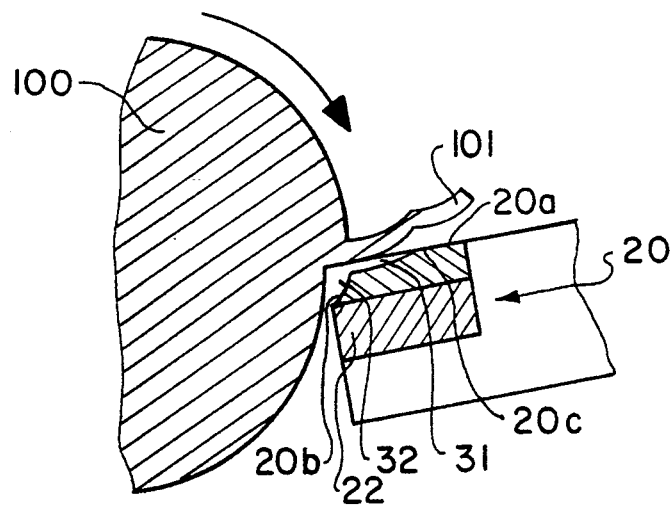
FIG. 2 is a partial cross-sectional view of a cutting process, using the cutting tool shown in FIG. 1.
Figure 3:
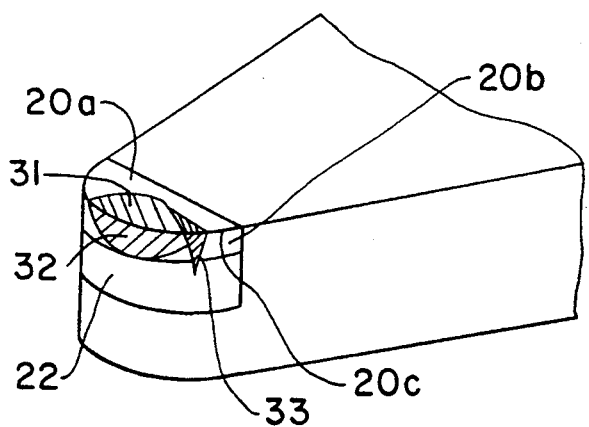
FIG. 3 shows the general wear portion of the cutting edge from the process shown in FIG. 2.
Figure 5:
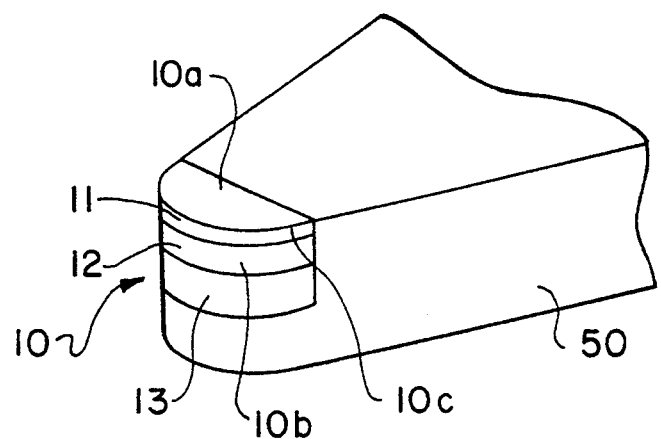
FIG. 5 is a partial side view of a cutting tool, according to the present invention.
Figure 6:
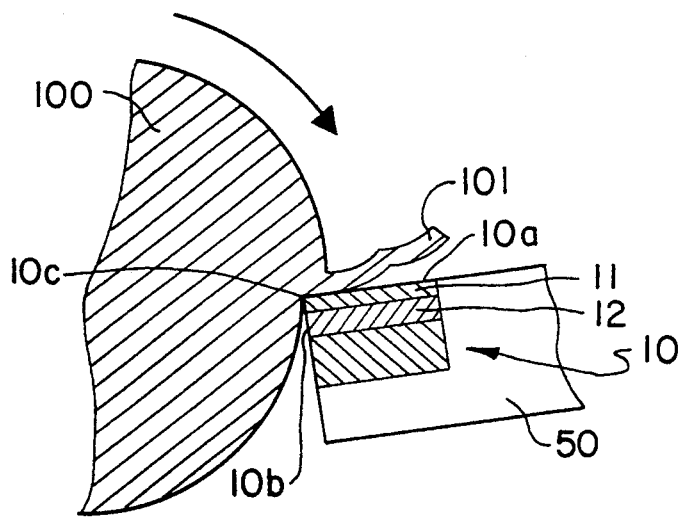
FIG. 6 is a partial cross-sectional view of a cutting process, using a cutting tool of the present invention.

FIG. 5 illustrates a side view in which the cutting edge portion (10) shown in FIG. 1 is bonded to a cemented carbide tool holder (50). The composite is bonded to the tool holder (50) by an existing intermediate cemented carbide layer (13). The main surface of the first sintered compact layer (11) is the rake face (10a) of the cutting edge portion (10). The cutting edge (10c) is bounded by the rake face (10a) and the flank face (10b). The flank face (10b) is constituted of the first sintered compact layer (11) and the second sintered compact layer (12). FIG. 6 illustrates a cross-section view of a cutting process using the present invention. A work-material (100) is cut by the cutting tool. The cutting edge (10c) enters into the surface of the workmaterial (100). A chip (101) is developed on the rake face (10a) made of the first sintered compact layer (11).

Other than diamond, cBN is the hardest material and has the highest heat conductivity. Further, cBN is chemically stable. Therefore, due to the high concentration of cBN in the sintered compact of the present invention, the sintered compact of the present invention is hard, has high heat conductivity, and is chemically stable. Further, the first sintered compact layer of the present invention is harder, has higher heat conductivity, and is more stable than the second sintered compact layer. In addition, Al or metal compounds of Al react with cBN, and create compounds such as $AlB_2$. These compounds serve to firmly bond the binder and cBN or another binder.

The first sintered compact layer contains approximately 75–98% by volume of cBN. When the concentration of cBN is less than about 75% by volume, crater wear easily develops as chemical stability is reduced because of the low amount of cBN. When the concentration of cBN is more than about 98% by volume, the amount of binder material becomes relatively lower, and the bonding strength of cBN particles is reduced.

A main surface of the first sintered compact layer of the present invention is a rake face of the cutting tool. The volume concentration of cBN in the first sintered compact layer is higher than in the second sintered compact layer. Generally, notch wear develops due to a reaction between air exposure, the work material and the cutting tool. Generally, crater wear develops due to a reaction between the work material and the cutting tool material at high temperatures. As cBN is chemically more stable than a binder material, the first sintered compact layer has better notch wear resistance and crater wear resistance than the second sintered compact layer.

The second sintered compact layer contains approximately 40–65% by volume of cBN. When the concentration of cBN is less than about 40% by volume, the strength and hardness of the sintered compact is reduced and flank wear develops easily, especially when cutting high speed steel. When the concentration of cBN is more than about 65% by volume, cBN particles easily fall from the sintered compact because the lower amount of binder material reduces the bonding strength between cBN particles and the bonding material.

On the other hand, the volume concentration of the binder material in the second sintered compact layer is higher than of the first sintered compact layer. Each cBN particle is strongly bonded to each other by binder material. Generally, flank wear develops as cBN particles fall from the sintered compact because a work material scours the cutting tool. Accordingly, the second sintered compact layer has higher flank wear resistance than the first sintered compact layer.

Therefore, in this invention, the layers of the sintered compact of the present invention are arranged to correspond to the types of wear. This arrangement prevents development of wear, so as to extend practical cutting time of the cutting tools of the present invention over that of the prior art.

Preferably the first binder material is comprised of about 3 to about 15% by weight of Co, about 1 to about 5% by weight of Al, with the remainder being WC and impurities. For the first type of the first binder material, when the concentration of Al is less than about 1% by weight, strength of the bond between cBN particles and the binder material weakens, due to an insufficient reaction between cBN particles and binder materials. When the concentration of Al is more than about 5% by weight, the wear resistance weakens, due to the small amount of WC.

In the alternative, the first binder material may be comprised of from about 3 to about 40% by weight of Al, the remainder having at least one Ti-containing compound selected from a group consisting of compounds (TiM)C, (TiM)N, (TiM)(CN), an admixture thereof, and a material solid solution compound thereof. In this case, M is a transition metal or metals of Groups IVa, Va or VIa of the Periodic Table, but excluding Ti. Preferably, W is the metal M.

For the second type of the first binder material, when the concentration of Al is less than 3% by weight, the strength of the bond between cBN particles and the binder materials weakens, due to a insufficient reaction between cBN particles and binder materials. When the concentration of Al is more than 40% by weight, crater wear resistance is reduced, because increasing the amount of reacted compounds, for example, $AlB_2$, relatively decreases the amount of compounds such as (Ti,M)C, (Ti,M)N, and (Ti,M)(C,N), which have good wear resistance.

It is preferable that the second binder material comprises from about 2 to about 30% by weight of Al, the remainder being at least one compound selected from a group consisting of compounds (Ti,X)C, (Ti,X)N, (TiX)(CN), an admixture thereof. In this case, X is a transition metal or metals of Group IVa, Va or VIa of the Periodic Table, excluding Ti. The second binder material also comprises impurities. Preferably, Hf is the metal X, because Ti compounds containing Hf have excellent heat resistance and, therefore, have excellent flank wear resistance at high speed cutting.

The second binder material contains 2–30% by weight of Al. When the concentration of Al is less than about 2% by weight, the strength of the bond between the cBN particles and the binder material weakens because of insufficient reaction between Al and cBN particles. When the concentration of Al is more than about 30% by weight, flank wear resistance weakens. Increasing the amount of reacted compounds, such as, for example, $AlB_2$, increases the bonding strength between cBN particles and binder materials, but decreases the flank wear resistance.

Preferably, the thickness of the first sintered compact layer is from about 0.04 to about 0.2 mm. When the thickness of the first sintered compact layer is thinner than about 0.04 mm, the depth of crater wear and notch wear may become 0.04 mm. When the thickness of the first sintered compact layer is thicker than about 0.2 mm, flank wear easily develops at the first sintered compact layer on the flank face.

Preferably the combined thickness of the first sintered compact layer and the second sintered compact layer is greater than about 0.5 mm. When the combined thickness is less than about 0.5 mm, flank wear width exceeds 0.5 mm and the cemented carbide substrate, which has less wear resistance and is chemically reactive compared with the cBN sintered compact, becomes worn.

EXAMPLE 1

The first sintered compact layer was prepared from raw materials of a binder material powder consisting of 5% by weight of Co powder, 3% by weight of Al powder and the remainder of WC powder, and cBN powder. The binder material powder and the cBN powder were prepared in a volume ratio of 15:85. The prepared powder was uniformly mixed using a cemented carbide pot and cemented carbide balls, so as to prepare a raw material powder having the desired particle diameter for the first sintered compact layer.

The second sintered compact layer was prepared from raw materials of a carbide powder, a nitride powder and a carbonitride powder which contains Ti and Al powder. The materials were mixed together as shown in Table 1. The binder material powders and cBN powder were prepared in a volume ratio of 40:60. The prepared powder was uniformly mixed using a cemented carbide pot and cemented carbide balls, so as to prepare raw material powders having the desired particle diameter for the second sintered compact layer. A circular plate of cemented carbide composed of WC-10 wt % Co was introduced into a Mo vessel. The raw material powder for the second sintered compact layer and the raw material powder for the first sintered compact layer were placed in that order on the circular plate of cemented carbide. This vessel was introduced into an extreme pressure and temperature apparatus, and sintered at a pressure of 50 Kb at a temperature of 1350° C. for 15 minutes. An examination of a polished surface of the obtained composites showed that two layers of the cBN sintered compacts were bonded strongly to each other and to the cemented carbide substrate.

The aforementioned composites were worked into cutting tools, so that the first sintered compact layer of each composite constituted a rake face and the thickness of the first sintered compact layer was 0.07 mm. The cutting tools, which were bonded to a cemented carbide tool holder, were applied to cut the outer portions of round bars with a 150 mm outside diameter and made of FCD 70 (nodular cast iron). The cutting conditions were as follows;

Cutting Speed: 250 m/min
Depth of Cut: 0.25 mm
Feed Rate: 0.20 mm/rev
Type: Wet
Time: 20 minutes Table I also shows values of the flank wear width of the cutting edges and whether chipping occurred or not.

TABLE 1

| Sample No. | Composition of Binder Material in the Second Sintered Compact Layer (wt. %) | Chipping | Flank Wear Width (mm) |
|---|---|---|---|
| Example | | | |
| 1 | 85 (Ti, Ta) C-15Al | Not Found | 0.11 |
| 2 | 75 (Ti, Zr) C-25Al | Not Found | 0.13 |
| 3 | 90 (Ti, Ta) (CN)-10Al | Not Found | 0.15 |
| 4 | 82 (Ti, W) (CN)-18Al | Not Found | 0.17 |
| 5 | 98 (Ti, Zr) N-2Al | Not Found | 0.10 |
| 6 | 70 (Ti, Mo) C-80Al | Not Found | 0.19 |
| Comparative Example | | | |
| 7 | 65 (Ti, Ta) C-35Al | Not Found | 0.29 |
| 8 | 99.2 (Ti, W) (CN)-0.8Al | Chipping Occurred after 10 Minutes of Cutting | — |

EXAMPLE 2

The first sintered compact layer was prepared from raw materials of a binder material powder comprising Co powder, and the remainder of WC powder, and cBN powder. These binder material powders and cBN powder were prepared in a volume ratio of 12:88. The prepared powders was uniformly mixed using a cemented carbide pot and cemented carbide balls, so as to prepare raw material powders for the first sintered compact layer were developed.

The second sintered compact layer was prepared as follows. (Ti,Hf)C powder and Al powder were prepared in a weight ratio of 9:1 for a binder material powder of the second sintered compact layer. The binder material powder and cBN powder were prepared in a volume ratio of 37:63. By uniformly mixing the prepared powder using a cemented carbide pot and cemented carbide balls, a raw material powder for the second sintered compact was developed.

As in Example 1, a circular plate of cemented carbide composed of WC-10 wt % Co was introduced into a Mo vessel and then the raw material powder for the second sintered compact layer was placed on the circular plate, followed by the raw material powder for the first sintered compact layer being placed on them. This vessel was introduced into an extreme pressure and temperature apparatus, and sintered under a pressure of 45 Kb at a temperature of 1300° C. for 20 minutes. An examination of a polished surface of the obtained composites showed that two layers of the cBN sintered compact, which correspond to the above two raw material powders, were bonded strongly to each other and to the cemented carbide substrate.

The aforementioned composites were worked into cutting tools, so that the first sintered compact layer of each composite constituted a rake face. The thickness of the first sintered compact layer was as shown in Table 2. The cutting tools, which were bonded to cemented carbide substrates, were applied to cut the outer portions of round bars with a 100 mm outside diameter made of nickel-base precipitation hardening alloy "INCONEL" 718. The cutting conditions were as follows;
Cutting Speed: 200 m/min
Depth of Cut: 0.20 mm
Feed Rate: 0.12 mm/rev
Type: Wet Table 2 also shows results of measured practical cutting time and the reasons for impractical cuttings.

Notch wear occurred in sample No. 15 due to insufficient thickness in the first sintered compact layer. In sample No. 18, the low content of Al in the first sintered compact reduced bonding strength between the cBN particles and chipping occurred. Substantial crater wear occurred in sample No. 19 due to the high content of Al in the first sintered compact layer.

TABLE 2

| Sample No. | The First Sintered Compact Layer Composition of Binder (wt. %) | Thickness (mm) | Reason for Impractical Cutting Time | Practical Cutting Time (Minutes) |
|---|---|---|---|---|
| 9 | 7Co-4Al-WC | 0.19 | Flank Wear | 19 |
| 10 | 10Co-3Al-WC | 0.10 | Notch Wear | 15 |
| 11 | 15Co-2Al-WC | 0.08 | Notch Wear | 13 |
| 12 | 3Co-5Al-WC | 0.15 | Flank Wear | 14 |
| 13 | 12Co-1Al-WC | 0.04 | Crater Wear | 11 |
| 14 | 7Co-3Al-WC | 0.06 | Notch Wear | 15 |
| 15 | 7Co-3Al-WC | 0.03 | Notch Wear | 7 |
| 16 | 16Co-6Al-WC | 0.06 | Crater Wear | 10 |
| 17 | 7Co-4Al-WC | 0.21 | Flank Wear | 9 |
| Comparative Example | | | | |
| 18 | 2Co-0.8Al-WC | 0.08 | Chipping | 1 |
| 19 | 10Co-45Al-WC | 0.15 | Crater Wear | 2 |

EXAMPLE 3

A mix binder material powder consisting of 7% by weight of Co powder. 4% by weight of Al powder and the remainder of WC powder was used for the first sintered compact layer. The binder material and cBN powder were prepared in a volume ratio as shown in Table 3. By uniformly mixing the prepared powders using a cemented carbide pot and cemented carbide balls, raw material powders were developed for the first sintered compact layer.

A mixed binder material powder consisting of (Ti,Hf)(CN) powder and Al powder in a weight ratio of 9:1 was used for the second sintered compact layer.

The binder material powder and cBN powder were prepared in a volume ratio as shown in Table 3. By uniformly mixing the prepared powders using a cemented carbide pot and cemented carbide balls, raw material powders were developed for the second sintered compact layer.

As in the first two examples, a circular plate of cemented carbide composed of WC-10 wt % Co was introduced into a Mo vessel, the raw material powder for the second sintered compact layer was placed on the circular plate and then the raw material powder for the first sintered compact layer was placed on the second layer. This vessel was introduced into a extreme pressure and temperature apparatus, and sintered under a pressure of 45 Kb at a temperature of 1300° C. for 20 minutes. An examination of the polished surface of the obtained composites showed that two layers of the cBN sintered compact which correspond to the above two raw material powders, were bonded strongly to each other and to the cemented carbide substrate.

The aforementioned composites were worked into cutting tools, so that the first sintered compact layer of each composite constituted a rake face and the thickness of the first sintered compact layer was 0.05 mm.

TABLE 3

| Sample No. | Composition of cBN and Binder (volume %) | | Practical Cutting Time (Minutes) |
|---|---|---|---|
| | The First Sintered Compact Layer | The Second Sintered Compact Layer | |
| Example | | | |
| 20 | 85:15 | 55:45 | 47 |
| 21 | 90:10 | 45:55 | 38 |
| 22 | 88:12 | 60:40 | 40 |
| 23 | 82:18 | 64:36 | 29 |
| 24 | 80:20 | 40:60 | 32 |
| 25 | 81:19 | 50:50 | 35 |
| Comparative Example | | | |
| 26 | 73:27 | 55:45 | 16 |
| 27 | 70:30 | 45:55 | 14 |
| 28 | 82:18 | 37:63 | 15 |
| 29 | 85:15 | 70:30 | 20 |

The cutting tools, which were bonded to cemented carbide tool holders, were applied to cut the outer portions of round bars with a 100 mm outside diameter made of FCD 100 (Nodular cast iron), having a V shaped groove at a periphery of the round bars. The cutting conditions were as follows:
Cutting Speed: 120 m/min.
Depth of Cut: 0.20 mm
Feed Rate: 0.15 mm/rev
Type: Wet Table 3 shows the results of the practical cutting time.

EXAMPLE 4

A binder material powder consisting of 10% by weight of Al and the remainder of (Ti,W)C, and cBN powder was used for developing raw material powders used for the first sintered compact layer. The binder material powder and the cBN powder were prepared in a volume ratio of 20:80. By uniformly mixing the prepared powder using a cemented carbide pot and cemented carbide balls, a raw material powder having the desired particle diameter was developed for the first sintered compact layer.

To develop a Carbide powder, a nitride powder and a carbonitride powder which contain Ti and Al powder, these powders were mixed together as shown in Table 4 for binder material powders of the second sintered compact layer. These binder material powders and cBN powder were prepared in a volume ratio of 45:55, and the prepared powders were uniformly mixed using a cemented carbide pot and cemented carbide balls. Raw material powders having the desired particle diameter were provided for the second sintered compact layer. A circular plate of cemented carbide was introduced into a Mo vessel, and then the raw material powder for the second sintered compact layer and the raw material powder for the first sintered compact layer were placed in that order on the circular plate of cemented carbide. This vessel was introduced into an extreme pressure and temperature apparatus, and sintered under a pressure of 50 Kb at a temperature of 1300° C. for 15 minutes. An examination of a polished surface of the obtained composites showed that two layers of the cBN sintered compacts which correspond to the above two raw material powders, were bonded strongly to each other and to the cemented carbide substrate.

TABLE 4

| Sample No. | Composition of Binder in the Second Sintered Compact Layer (wt %) | Chipping | Flank Wear Width (mm) |
| --- | --- | --- | --- |
| Example | | | |
| 30 | 85 (Ti, Hf) C-15Al | Not Found | 0.10 |
| 31 | 75 (Ti, Zr) C-25Al | Not Found | 0.15 |
| 32 | 90 (Ti, Ta) (CN)-10Al | Not Found | 0.13 |
| 33 | 82 (Ti, Hf) (CN)-18Al | Not Found | 0.17 |
| 34 | 98 (Ti), W) N-2Al | Not Found | 0.18 |
| 35 | 70 (Ti, Mo) C-30Al | Not Found | 0.20 |
| Comparative Example | | | |
| 36 | 65 (Ti, W) C-35Al | Not Found | 0.3 |
| 37 | 99 (Ti, Ta) (CN)-1Al | Chipping Happened after 10 minutes Cutting | — |

The aforementioned composites were developed into cutting tools so that the first sintered compact layer of each composite constituted a rake face and thickness of the first sintered compact was 0.05 mm. The cutting tools which were bonded to cemented carbide tool holders, were applied to cut the outer portions of round bars with a 100 mm outside diameter made of FCD 60 (Nodular cast iron). The cutting conditions were as follows:
 Cutting Speed: 300 m/min
 Depth of Cut: 0.35 mm
 Feed Rate: 0.20 mm/rev
 Type: Wet
 Time: 30 minutes
Table 4 shows the values of the flank wear width of the cutting edges and whether or not chipping occurred.

EXAMPLE 5

(Ti,Hf)C powder and Al powder were prepared in a weight ratio of 9:1 for a binder material powder of the second sintered compact layer. This binder material powder and cBN powder were prepared in a volume ratio of 40:60. By uniformly mixing the prepared powders using a cemented carbide pot and cemented carbide balls, raw material powders for the second sintered compact layer were developed. To develop a carbide powder, a nitride powder and a carbonitride powder which contain Ti and Al powder, were mixed together as shown in Table 5 for binder material powders of the first sintered compact layer.

TABLE 5

| Sample No. | The First Sintered Compact Layer | | Reason for Impractical Cutting | Practical Cutting Time (Minutes) |
| --- | --- | --- | --- | --- |
| | Composition of Binder (wt. %) | Thickness | | |
| Example | | | | |
| 38 | 93 (Ti, V) (CN)-7Al | 0.19 | Flank Wear | 16 |
| 39 | 95 (Ti, W) C-5Al | 0.15 | Notch Wear | 21 |
| 40 | 71 (Ti, Ta) N-29Al | 0.11 | Flank Wear | 19 |
| 41 | 85 (It, Hf) C-15Al | 0.09 | Flank Wear | 17 |
| 42 | 97 (Ti, Zr) (CN)-3Al | 0.08 | Notch Wear | 16 |
| 43 | 90 (Ti, Hf) C-10Al | 0.07 | Notch Wear | 23 |
| 44 | 90 (Ti, W) C-10Al | 0.02 | Notch Wear | 13 |
| 45 | 99 (Ti, Mo) C-1Al | 0.14 | Chipping | 10 |
| 46 | 96 (Ti, W) (CN)-4Al | 0.21 | Flank Wear | 14 |
| Comparative Example | | | | |
| 47 | 58 (Ti, Zr) N-42Al% | 0.06 | Crater Wear | 3 |

As in Example 4, a circular plate of cemented carbide was introduced into a Mo vessel and the raw material powder for the second sintered compact layer was placed on the circular plate, and then the raw material powder for the first sintered compact layer was further placed on the second layer. This vessel was introduced into an extreme pressure and temperature apparatus, and sintered under a pressure of 45 Kb at a temperature of 1300° C. for 20 minutes. An examination of a polished surface of the obtained composites showed that two layers of the cBN sintered compact which correspond to the above two raw material powders, were bonded strongly to each other and to the cemented carbide substrate. The composites were worked into a cutting tool. The first sintered compact layer of each composite constituted a rake face and thickness of the first sintered compact is shown in Table 5. The cutting tools, which were bonded to a cemented carbide tool holder, were applied to cut the outer portions of round bars with a 100 mm outside diameter made of nickel-base precipitation hardening alloy "INCONEL" 718. The cutting conditions were as follows;
 Cutting Speed: 170m/min
 Depth of Cut: 0.20 mm
 Feed Rate: 0.12 mm/rev
 Type: Wet
Table 5 shows the results of the measured practical cutting time and the reasons for impractical cuttings. Notch wear occurred in sample No. 44 due to the reduced thickness in the first sintered compact layer, thus reducing practical cutting time. In sample No. 45, a low content of Al in the first sintered compact layer reduced bonding strength between the cBN particles, and chipping occurred. In sample No. 47, there was substantial crater wear due to the high content of Al in the first sintered compact layer.

EXAMPLE 6

A mixed binder material powder consisting of 15% by weight of Al powder and the remainder of (Ti,Hf)C powder was developed for the first sintered compact layer. The binder material powder and cBN powder were prepared in a volume ratio as shown in Table 6. Raw material powders for the first sintered compact layer were obtained by the method used in example 5. A mixed binder material powder consisting of 10% by weight of Al powder and the remainder of (Ti,W)(CN) was provided for the second sintered compact layer.

TABLE 6

| Sample No. | Composition of cBN and Binder (volume %) | | Practical Cutting Time (Minutes) |
|---|---|---|---|
| | The First Sintered Compact Layer | The Second Sintered Compact Layer | |
| Example | | | |
| 48 | 75:25 | 50:50 | 59 |
| 49 | 97:3 | 55:45 | 53 |
| 50 | 80:20 | 60:40 | 68 |
| 51 | 85:15 | 63:37 | 60 |
| 52 | 90:10 | 59:41 | 53 |
| 53 | 77:23 | 41:59 | 51 |
| Comparative Example | | | |
| 54 | 73:27 | 60:40 | 37 |
| 55 | 85:15 | 38:62 | 33 |
| 56 | 80:20 | 66:34 | 29 |
| 57 | 99:1 | 38:62 | 18 (chipping) |

This binder material powder and cBN powder were prepared in a volume ratio as shown in Table 6. By uniformly mixing the prepared powders using a cemented carbide pot and cemented carbide balls, raw material powders were developed for the second sintered compact layer.

Next, a circular plate of cemented carbide composed of WC-8 wt. % Co as introduced into a Mo vessel, the raw material powder for the second sintered compact layer was placed on the circular plate, and then the raw material powder for the first sintered compact layer was placed on the second layer. This vessel was introduced into an extreme pressure and temperature apparatus, and sintered under a pressure of 45 Kb at a temperature of 1250° C. for 20 minutes. An examination of a polished surface of the obtained composites showed that two layers of the cBN sintered compact which correspond to the above two raw material powders, were bonded strongly to each other and to the cemented carbide substrate.

The aforementioned composites were worked into cutting tools, so that the first sintered compact layer of each composite constituted a rake face and the thickness of the first sintered compact layer was 0.05 mm. The cutting tools, which were bonded to a cemented carbide tool holder, were applied to cut the outer portions of round bars with a 100 mm outside diameter made of FCD 45 (Nodular cast iron). The cutting conditions were as follows;
Cutting Speed: 350 m/min
Depth of Cut: 0.30 mm
Feed Rate: 0.20 mm/rev
Type: Wet Table 6 shows the results of the measured practical cutting time.

Although the present invention has been described in detail, it is clearly understood that the same is by way of example only and is not to be taken by way of limitation, the scope of the present invention being limited only by the terms of the appended claims.

The following is claimed:

1. A CBN sintered compact for a cutting tool, comprising:
   (a) a first sintered compact layer comprising from about 75 to about 98% by volume of CBN, and a first binder material comprising from about 1 to about 40% by weight Al admixed with at least one compound containing Ti; selected from the group consisting of (Ti,M) C, (Ti,M)N, (Ti,M)(CN), an admixture thereof and a solid solution compound thereof, where M represents a transition metal element or elements belonging to any one of groups IVa, Va and VIa of the periodic table excluding Ti; wherein said first sintered compact layer has a thickness of from about 0.04 to about 0.2 mm;
   (b) a second sintered compact layer comprising from about 40% to 65% by volume of CBN, and a second binder material containing from about 2 to about 30% by weight Al;
   (c) said first sintered compact layer bonded to said second sintered compact layer; and
   (d) wherein said first sintered compact layer comprises a rake face of said cutting tool.

2. The cBN sintered compact as claimed in claim 1, wherein said second binder material contains about 2 to about 30% by weight of Al element and at least one compound selected from a group consisting of (Ti,X)C, (Ti,X)N, (T,X) (CN), an admixture thereof and a solid solution compound thereof, wherein X represents a transition metal element or elements belonging to any one of groups IVa, Va and VIa of the Periodic table excluding Ti.

3. The cBN sintered compact as claimed in claim 1, wherein said second sintered compact layer is bonded to a cemented carbide substrate.

4. The cBN sintered compact as claimed in claim 1, wherein the combined thickness of said first sintered compact layer and said second sintered compact layer is at least about 0.5 mm.

5. The cBN sintered compact as claimed in claim 1, wherein the transition metal M is W.

6. The cBN sintered compact as claimed in claim 2, wherein the transition metal X is Hf.

7. A cutting tool, comprising:
a tool holder, and
said first and second sintered compact layers of claim 1 bonded to said tool holder
wherein said first sintered compact layer comprises a rake face of said cutting tool.

* * * * *